United States Patent
Kolodkin

(10) Patent No.: US 10,345,577 B2
(45) Date of Patent: Jul. 9, 2019

(54) CONTROLLING OPENING ANGLE OF A RESONATING MIRROR

(71) Applicant: STMicroelectronics Ltd, Netanya (IL)

(72) Inventor: Mark Kolodkin, Holon (IL)

(73) Assignee: STMicroelectronics LTD, Netanya (IL)

( * ) Notice: Subject to any disclaimer, the term of this patent is extended or adjusted under 35 U.S.C. 154(b) by 0 days.

(21) Appl. No.: 15/645,259

(22) Filed: Jul. 10, 2017

(65) Prior Publication Data

US 2017/0307873 A1    Oct. 26, 2017

Related U.S. Application Data

(62) Division of application No. 14/937,155, filed on Nov. 10, 2015, now Pat. No. 9,740,002.

(51) Int. Cl.
*G02B 26/08* (2006.01)

(52) U.S. Cl.
CPC ....... *G02B 26/0841* (2013.01); *G02B 26/085* (2013.01)

(58) Field of Classification Search
CPC .............. G02B 26/085; G02B 26/0841; G02B 26/0833; G02B 26/084

USPC ....................................... 359/199.2
See application file for complete search history.

(56) References Cited

U.S. PATENT DOCUMENTS

| 8,553,308 B2 | 10/2013 | Goren et al. |
| 2003/0174376 A1 | 9/2003 | Sane et al. |
| 2007/0177241 A1* | 8/2007 | Keh .................. G02B 26/0833 359/200.7 |

* cited by examiner

*Primary Examiner* — Euncha P Cherry
(74) *Attorney, Agent, or Firm* — Crowe & Dunlevy

(57) ABSTRACT

A device described herein includes a movable MEMS mirror, with a driver configured to drive the movable MEMS mirror with a periodic signal such that the MEMS mirror oscillates at its resonance frequency. A feedback measuring circuit is configured to measure a signal flowing through the movable MEMS mirror. A processor is configured to sample the signal at first and second instants, generate an error signal as a function of a difference between the signal at the first instant in time and the signal at the second instant in time, and determine the opening angle of the movable MEMS mirror as a function of the error signal.

20 Claims, 6 Drawing Sheets

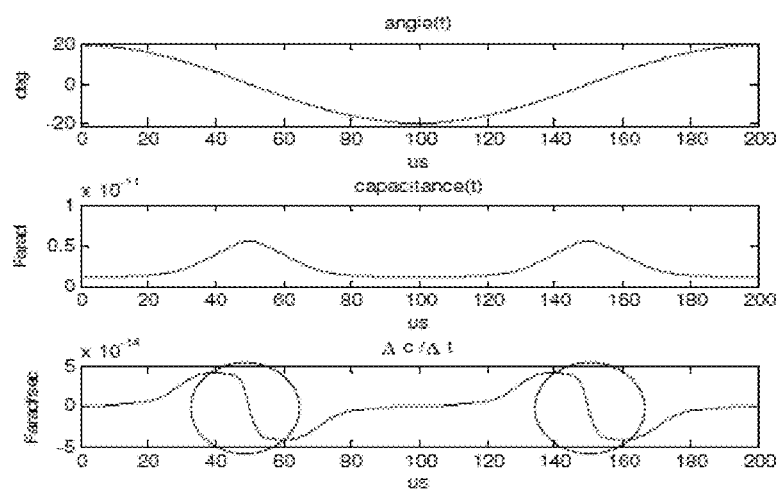
FIG. 5
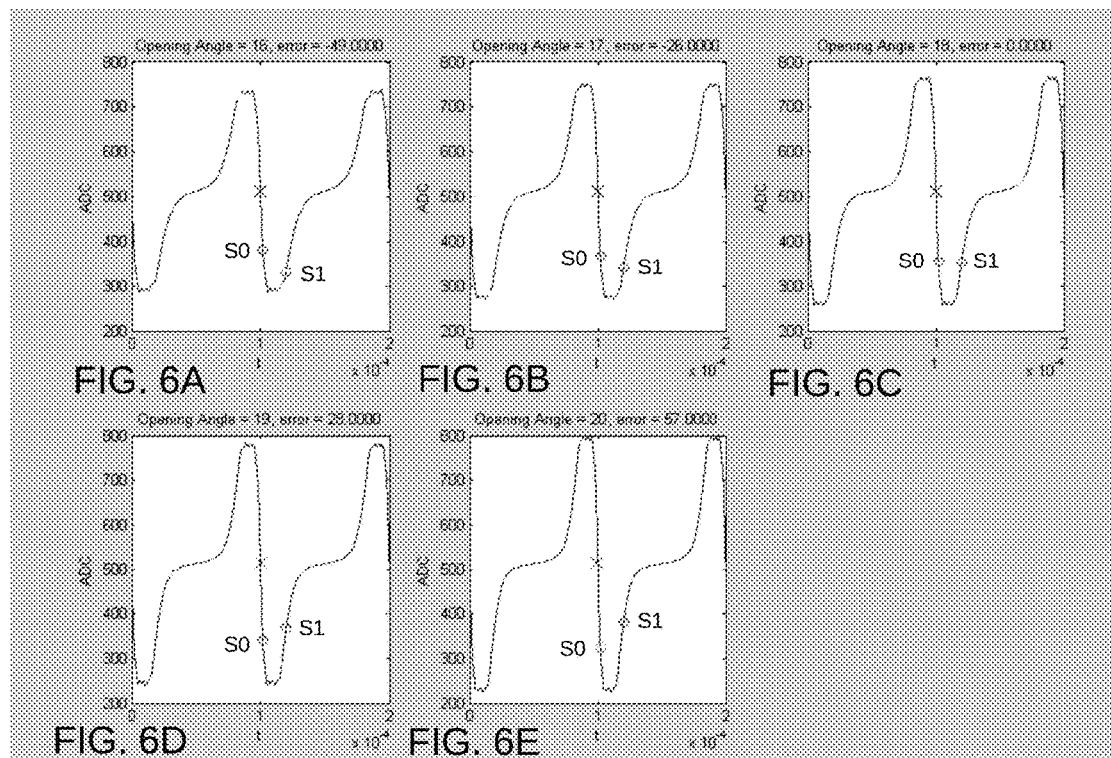
FIG. 6A   FIG. 6B   FIG. 6C
FIG. 6D   FIG. 6E

CONTROLLING OPENING ANGLE OF A RESONATING MIRROR

RELATED APPLICATION

This application is a divisional of U.S. application Ser. No. 14/937,155, filed Nov. 10, 2015, the contents of which are hereby incorporated by reference in their entirety to the maximum extent allowable under the law.

TECHNICAL FIELD

This disclosure relates to optical systems for scanning or deflecting light beams, and, in particular, to determining and controlling the opening angles of oscillating mirrors in MEMS devices.

BACKGROUND

Certain devices such as wafer defect scanners, laser printers, document scanners, projectors and the like often employ a collimated laser beam that scans across a flat surface in a straight line path. These devices employ tilting mirrors to deflect the beam to perform the scanning. These tilting mirrors may be, or may include, Micro Electro Mechanical Systems ("MEMS") devices.

Common mirrors used in MEMS devices include a stator and a rotor, with the rotor or structures carried by the rotor being reflective. The stator and/or rotor are driven with a drive signal which results in the rotor rotating with respect to the stator, thereby changing the angle of reflectance of an incident light beam on the rotor. By oscillating the rotor between two set points, an opening angle of the mirror is defined, and scanning of the light beam across the flat surface is accomplished.

It is desirable to be able to precisely control the movements of the rotor. To enable that precise control, collection of accurate data about the current position of the mirror is important. The collection of such accurate data, and consequently the precise control of the mirror, has proven troublesome due to changes in temperature, changes to the light beam itself, and other factors. This can result in commercially undesirable performance of the device. Thus, there is a commercial desire for the development of accurate ways to measure data about the position of the mirror, and precise ways to control the position of the mirror, are desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A device described herein includes a movable MEMS mirror, with a driver configured to drive the movable MEMS mirror with a periodic signal such that the MEMS mirror oscillates at its resonance frequency. A feedback measuring circuit is configured to measure a signal flowing through the movable MEMS mirror. A processor is configured to sample the signal at first and second instants, generate an error signal as a function of a difference between the signal at the first instant in time and the signal at the second instant in time, and determine the opening angle of the movable MEMS mirror as a function of the error signal.

A method aspect is directed to a method of controlling an opening angle of a movable MEMS mirror. The method includes driving the movable MEMS mirror with a periodic signal such that the MEMS mirror oscillates and measuring a signal flowing through the movable MEMS mirror as it oscillates. The method also includes generating an error signal as a function of a difference between a first current of the signal at a first instant in time and a second current of the signal at a second instant in time, with the first and second instants in time being instants at which absolute values of the first and second currents would be equal for a given opening angle. The opening angle of the movable MEMS mirror is determined as a function of the error signal. The opening angle of the movable MEMS mirror is changed based upon the opening angle not being equal to the given opening angle.

Another method aspect is directed to a method that includes driving a movable MEMS mirror with a periodic signal such that the MEMS mirror oscillates and measuring a signal flowing through the movable MEMS mirror as it oscillates. The method also includes sampling the signal at first and second instants in time and generating an error signal as a function of a difference between a current of the signal at the first instant in time and a current of the signal at the second instant in time. The opening angle of the movable MEMS mirror is determined as a function of the error signal.

BRIEF DESCRIPTION OF THE DRAWINGS

FIG. 5 is a series of graphs that demonstrate typical capacitance changes as a movable MEMS mirror resonates.

FIG. 6A-6E are a series of graphs of feedback signal current vs. time for various opening angles of a movable MEMS mirror.

DETAILED DESCRIPTION

Figure 1:
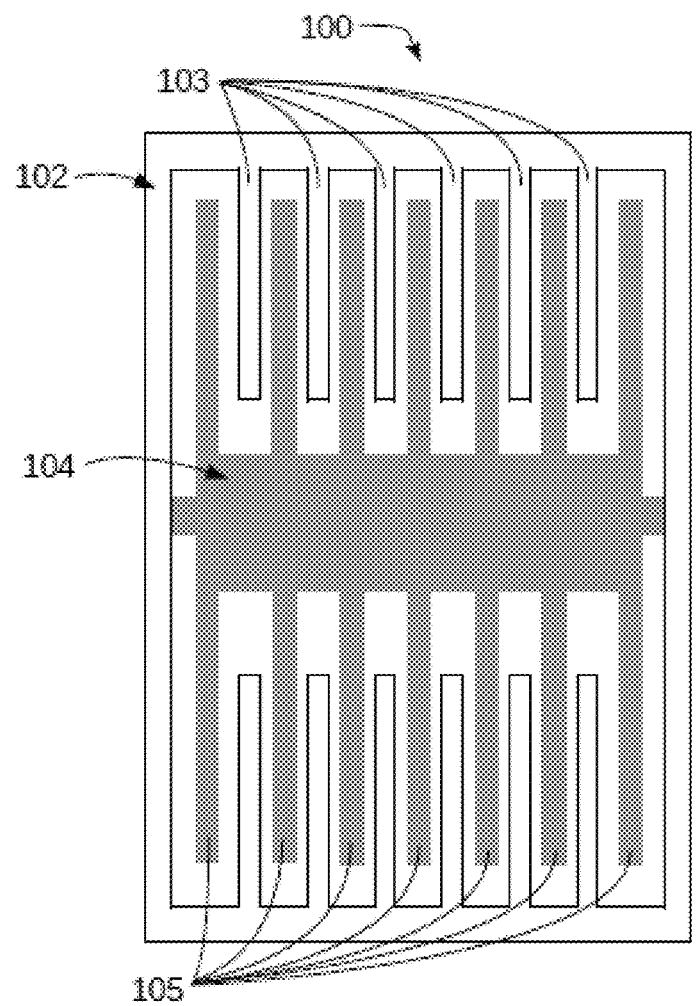
FIG. 1 is a schematic cutaway view of a movable MEMS mirror as may be used with the techniques described in this disclosure.

One or more embodiments of the present disclosure will be described below. These described embodiments are only examples of the presently disclosed techniques. Additionally, in an effort to provide a concise description, all features of an actual implementation may not be described in the specification.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Like reference numbers in the drawing figures refer to like elements throughout, and reference numbers separated by century, as well as reference numbers with prime notation, indicate similar elements in other applications or embodiments.

First, a movable MEMS mirror 100 such as may be used in devices such as wafer defect scanners, laser printers, document scanners, projectors, and pico-projectors will now be described with reference to FIG. 1. The movable MEMS mirror 100 includes a stator 102 having inwardly projecting fingers 103. A rotor 104 is positioned within the stator 102 and has outwardly projecting fingers 105 that interleave with the inwardly projecting fingers 103 of the stator 102.

Either the stator 102 or the rotor 104 is supplied with a periodic signal, such as a square wave, while the other is supplied with a reference voltage. In the case where the periodic signal has an oscillating square voltage, for example, electrostatic forces cause the rotor 104 to rotate relative to the stator 102. In the case where the periodic signal has an oscillating square, for example, magnetic forces cause the rotor 104 to rotate relative to the stator 102. Indeed, the movable MEMS mirror 100 may be driven according to any suitable way known to those of skill in the art.

Figure 2:
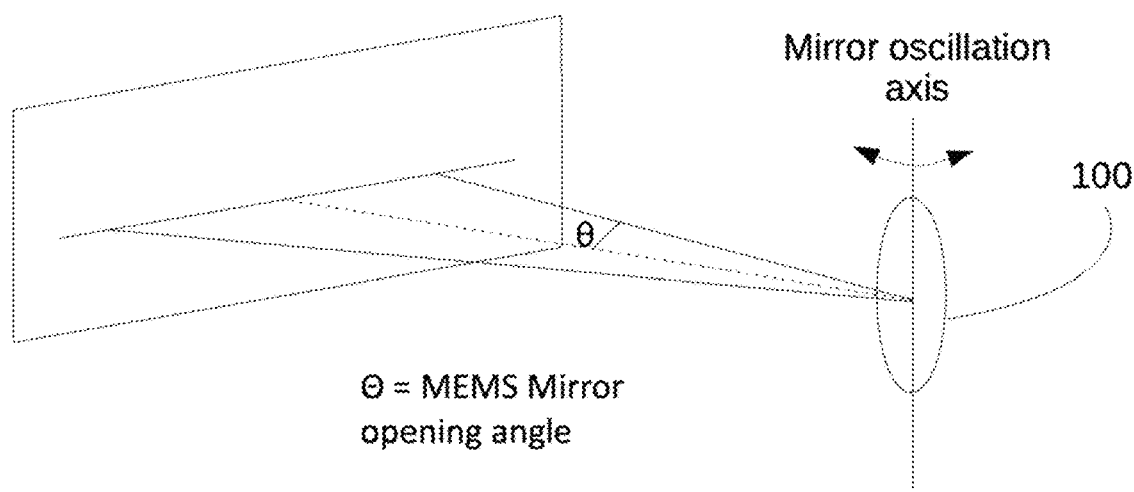
FIG. 2 is a perspective view showing operation of a movable MEMS mirror scanning in accordance with the techniques described in this disclosure.

For use in scanning a light beam across a surface, the movable MEMS mirror 100 is driven so that it oscillates at its resonant frequency between two set rotation limits. Shown in FIG. 2 is the movable MEMS mirror 100 scanning a light beam across a projection screen between two set rotation limits that define an "opening angle" θ of the movable MEMS mirror 100.

Figure 3:
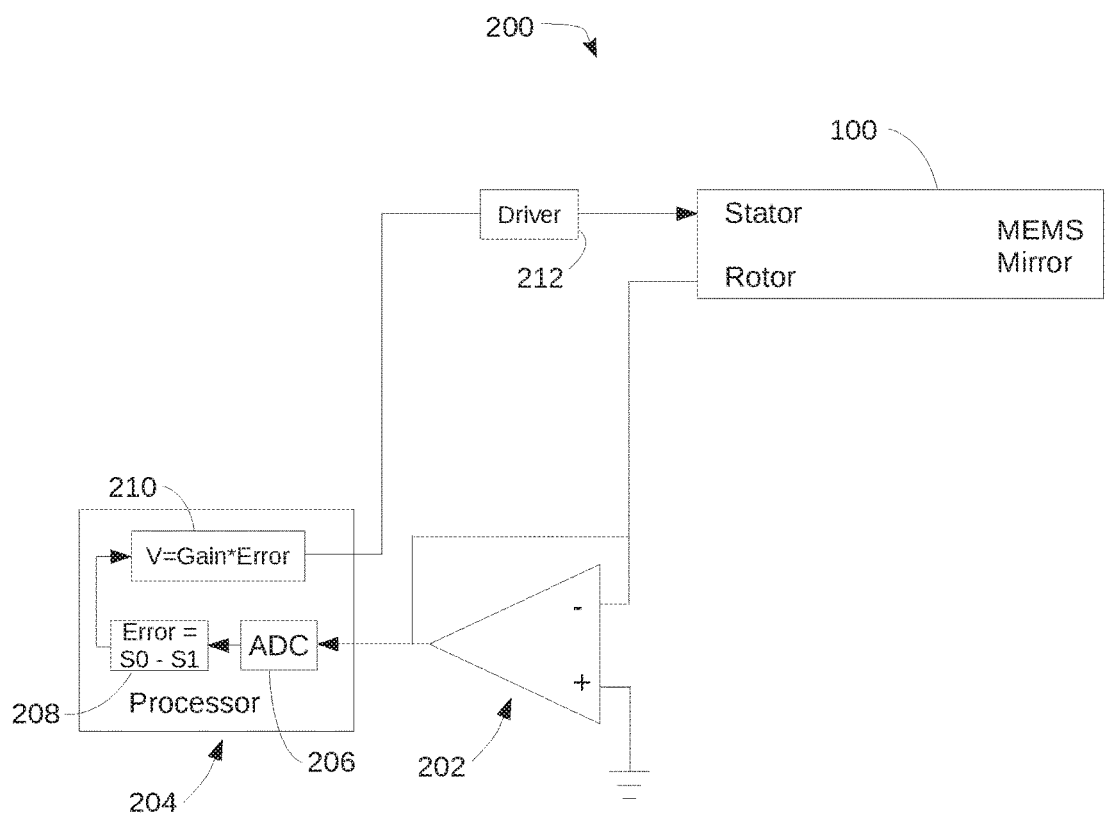
FIG. 3 is a schematic block diagram of a system for measuring and controlling the opening angle of a MEMS mirror in accordance with the techniques described in this disclosure.

A system 200 for measuring and controlling the opening angle of the movable MEMS mirror 100 is now described with reference to FIG. 3. The system 200 includes a current sensing operational amplifier 202 having an inverting input coupled to the rotor of the movable MEMS mirror 100, and a non-inverting input coupled to ground. A microcontroller 204 has an input coupled to receive the output of the operational amplifier 202. It should be appreciated that although a microcontroller 204 is shown, any suitable circuitry, such as a programmable logic device, may be used instead.

The microcontroller 204 includes an analog to digital converter (ADC) 206 that serves as the input to the microcontroller 204 and delivers its output to calculation block 208, which in turn delivers its output to calculation block 210. It should be understood that the calculation blocks 208 and 210 represent software functionality carried out by microcontroller 204, or in the case where a programmable logic device is used instead, the calculation blocks 208 and 210 may represent electrical circuits such as logic gates, amplifiers, and various arrangements of transistors. The output of the calculation block 210 and the microcontroller 204 is coupled to a driver 212, which in turn is coupled to the stator of the movable MEMS mirror 100.

The operation of the system 200 will be described below, but first the relationship between a capacitance between the stator 102 and rotor 104 and the opening angle of the movable MEMS mirror 100 will be described.

Figure 4:
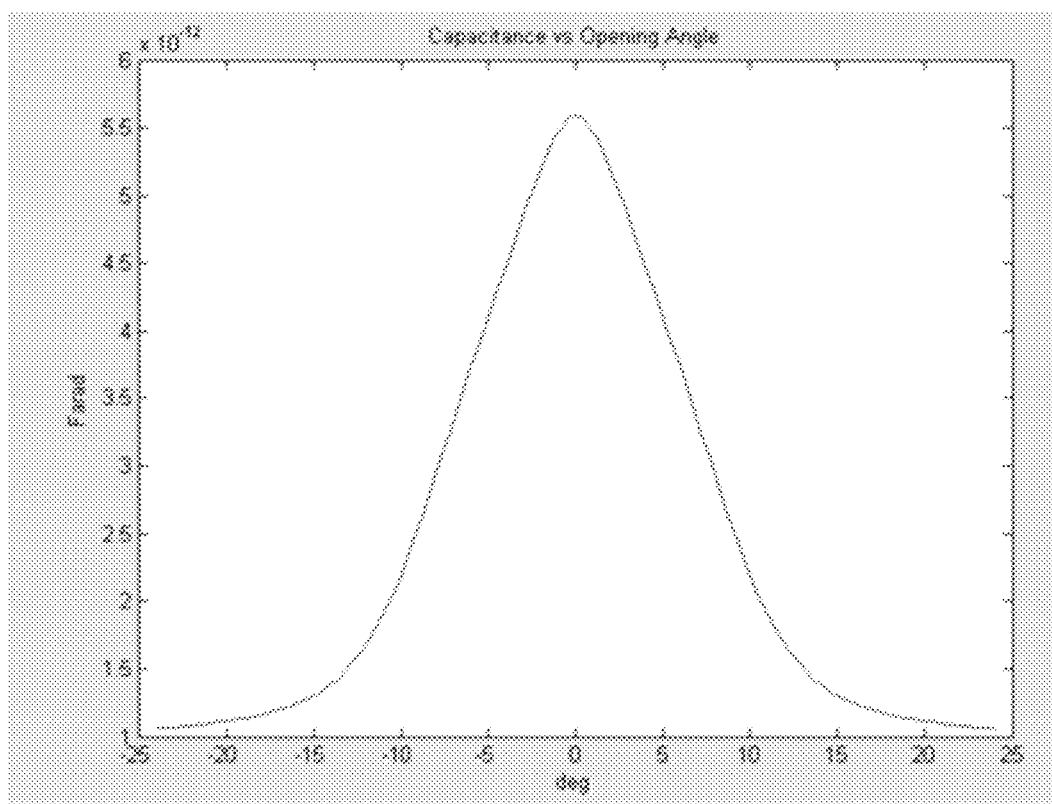
FIG. 4 is a graph of capacitance vs opening angle of a movable MEMS mirror.

The capacitance between the stator 102 and rotor 104 varies as a function of the opening angle of the movable MEMS mirror 100, as shown in FIGS. 4-5. Mathematically, the charge on a capacitor is equal to the capacitance across the capacitor multiplied by the voltage across the capacitor, which can be represented as:

$$Q(t) = C(t) * V(t)$$

The current through the capacitor is equal to the derivative of the charge with respect to time, which can be represented mathematically as:

$$I(t) = \frac{dQ(t)}{dt} = V(t) * \frac{dC}{dt} + C(t) * \frac{dV}{dt}$$

Since V(t) is constant at the time of sampling, the $$C(t) * \frac{dV}{dt}$$

term cancels out, and I(t) is dependent on the change in capacitance. Since current can be easily measured, the above relation is useful. In operation, the driver 212 drives either the stator 102 or rotor 104 of the movable MEMS mirror 100 with a periodic signal suitable for causing the rotor 104 to oscillate at the resonance frequency of the movable MEMS mirror 100. The current sensing operational amplifier 202 serves as a circuit to measure a feedback signal, and outputs a signal indicative of a current flowing through the stator 102 or rotor 104, depending on which was supplied with the periodic signal by the driver 212.

The signal output by the current sensing operational amplifier 202 is converted to the digital domain by the ADC 206 of the microcontroller 204, and the signal is then sampled at calculation block 208. Shown in FIG. 6A-6E are graphs of the sampled signal values vs time. Since the movable MEMS mirror 100 is oscillating, the graphs show that the signal is periodic.

The sampling is done at two instants in time at which the sampled values are known to be equal for a known opening angle of the movable MEMS mirror. For example, the graphs shown in FIG. 6A-6E each have two circled points S0 and S1, with one circled point being on the falling edge of the signal, and the other circled point being on the next rising edge of the signal. Here, the instants in time S0 and S1 are set such that the sampled values are equal for an opening angle of 18 degrees, as shown in FIG. 6C. When the sampled value at S0 is greater than the sampled value at S1, the opening angle is less than the desired opening angle (here, the desired opening angle is 18 degrees), as shown in FIGS. 6A-6B. Similarly, when the sampled value at S0 is less than the sampled value at S1, the opening angle is greater than the desired opening angle, as shown in FIGS. 6D-6E.

θ is a function of the difference between the currents measured at the first and second instants in time. Thus, an error value is generated at calculation block 208 by subtracting the value of the current at the second instant in time from the value of the current at the first instant in time. Using a predetermined first order linear approximation made via using a least minimal squares approach, the error value can be used to determine the opening angle of the movable MEMS mirror. This linear approximation is:

Error=−476.8+θ*26.6.

Figure 7:
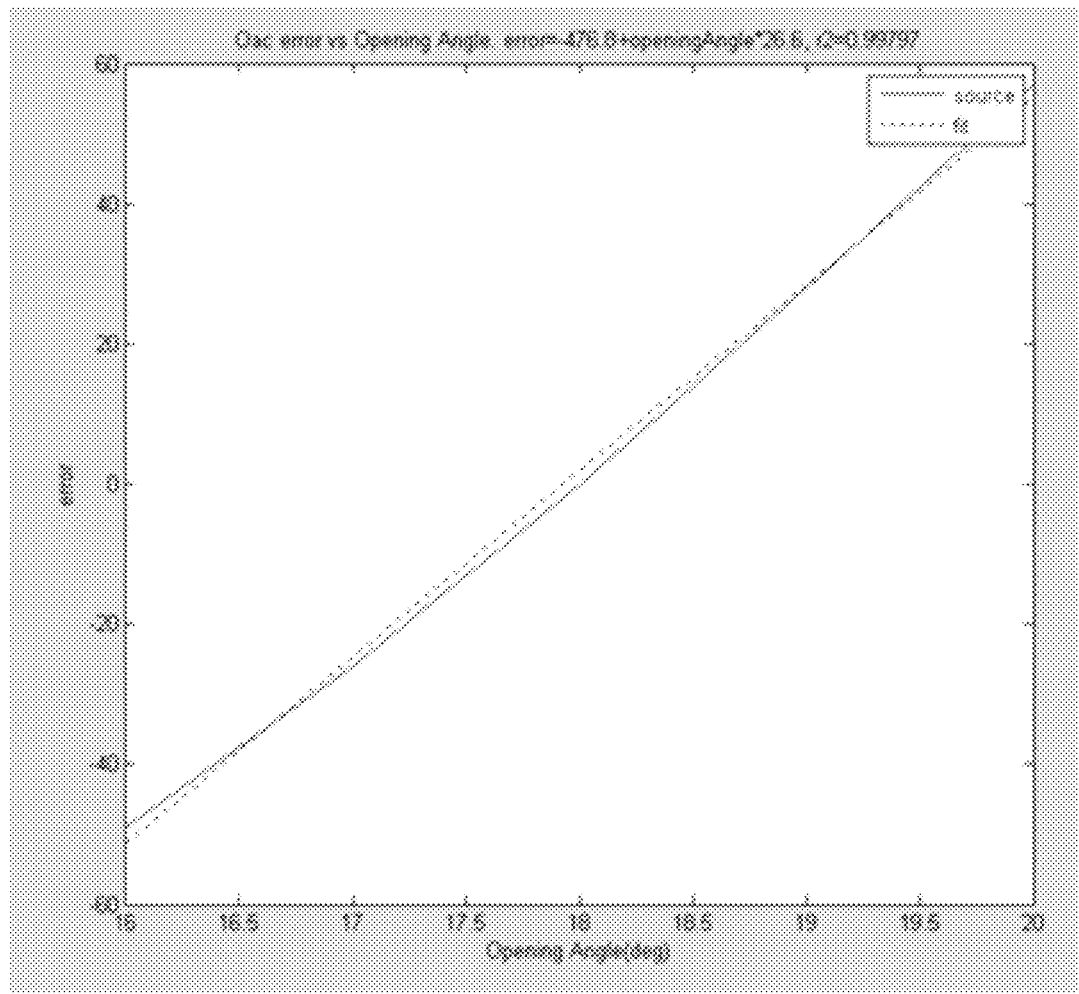
FIG. 7 is a graph of error vs opening angle of a movable MEMS mirror calculated in accordance with this disclosure.

As will be readily appreciated, for this specific example, an error value of zero indicates an opening angle of 18, while other error values indicate other opening angles. This linear approximation provides good accuracy for estimating opening angle, giving results close to the actual values of the opening angle, as shown in FIG. 7. As should be appreciated, the timing of the first and second instants of time may be selected such that they have the same current value for any desired opening angle, and thus the linear approximation given above may change such that the error being zero may mean that the opening angle is equal to the desired opening angle. Therefore, the constants −476.8 and 26.6 shown above may be different, and indeed, may greatly vary if the error being zero is determined around an opening angle that is not 18, or between different individual movable MEMS mirrors.

The error value can be used for controlling the opening angle. Calculation block 210 can use the error value and the driving periodic signal to determine a gain to be applied to the driving period signal which will result in the opening angle changing to a desired value. Thus, the error value can be used to create a control loop capable of not only precisely keeping the opening angle at a desired value, but also for changing the opening angle to a different desired value.

Figure 3A:
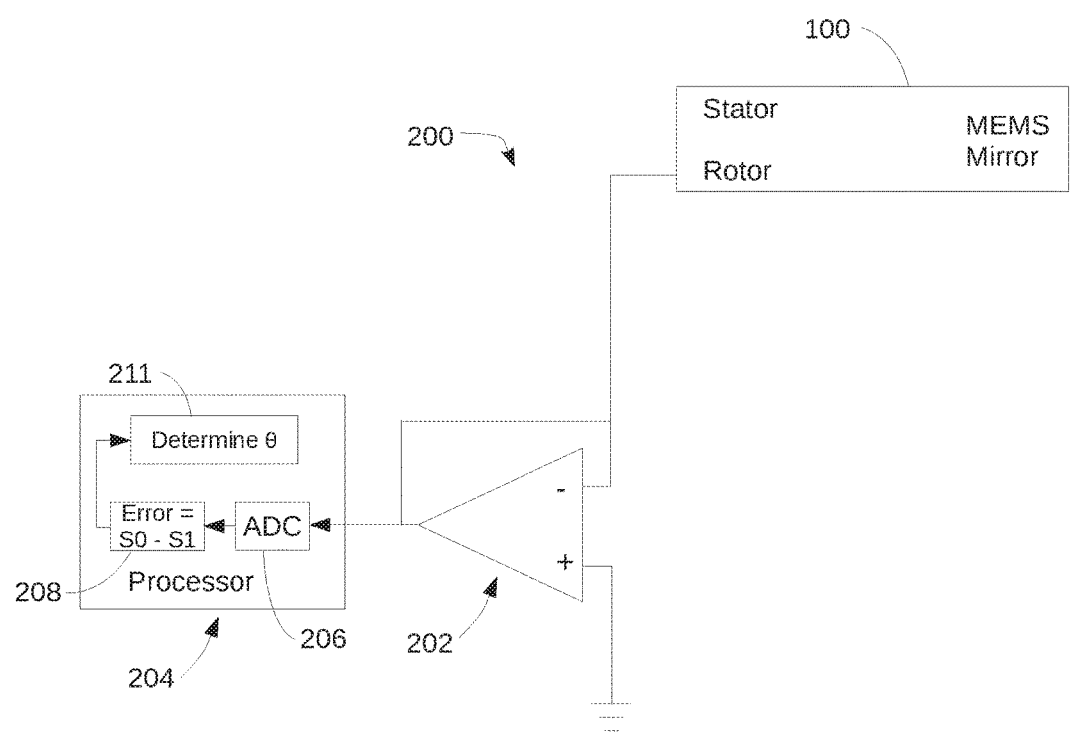
FIG. 3A is a schematic block diagram of a system for measuring the opening angle of a MEMS mirror in accordance with the techniques described in this disclosure

In an alternate implementation shown in FIG. 3A, the calculation block 210 is replaced with an angle determination block 211 that determines the opening angle as a function of the error signal. This alternate implementation lacks the driver 212, as it does not include circuitry to control the opening angle.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A method of controlling an opening angle of a movable MEMS mirror, comprising:
    driving the movable MEMS mirror with a periodic signal such that the movable MEMS mirror oscillates;
    measuring a signal flowing through the movable MEMS mirror as it oscillates;
    generating an error signal as a function of a difference between a first current of the signal at a first instant in time and a second current of the signal at a second instant in time, the first and second instants in time being instants in time at which absolute values of the first and second currents are expected to be equal for a given opening angle;
    determining the opening angle of the movable MEMS mirror as a function of the error signal;
    changing the opening angle of the movable MEMS mirror based upon the opening angle not being equal to the given opening angle.

2. The method of claim 1, wherein the opening angle of the movable MEMS mirror is changed by changing the periodic signal so that the error signal equals zero.

3. The method of claim 1, wherein the opening angle of the movable MEMS mirror is changed by changing the periodic signal so that the error signal equals a value associated with the given opening angle.

4. The method of claim 3, wherein the periodic signal is changed by changing a voltage of the periodic signal.

5. The method of claim 1, wherein the opening angle of the movable MEMS mirror is determined based upon a sum of the error signal and a first constant, divided by a second constant.

6. The method of claim 5, wherein the first constant is between 450 and 500, and wherein the second constant is between 24 and 30.

7. The method of claim 1, wherein the current at the first instant in time is on a falling edge of the signal and the current at the second instant in time is on a rising edge of the signal.

8. The method of claim 1, wherein the error signal is used to determine the opening angle using a first order linear approximation involving a least minimal squares approach.

9. The method of claim 8, wherein in response to the given opening angle being 18 degrees, the opening angle is calculated as:

$$\theta = \text{Error} + 476.8/26.6$$

10. The method of claim 1, wherein the opening angle of the movable MEMS mirror is changed by determining a gain to be applied to the periodic signal which will result in the opening angle changing to the given opening angle.

11. The method of claim 1, wherein the first current of the signal at the first instant in time being greater than the second current of the signal at the second instant in time indicates that the opening angle is less than the given opening angle; and wherein the opening angle is changed by increasing it such that the first current of the signal at the first instant in time is equal to the second current of the signal at the second instant in time.

12. The method of claim 1, wherein the first current of the signal at the first instant in time being less than the second current of the signal at the second instant in time indicates that the opening angle is greater than the given opening angle; and wherein the opening angle is changed by decreasing it such that the first current of the signal at the first instant in time is equal to the second current of the signal at the second instant in time.

13. The method of claim 1, wherein the movable MEMS mirror has a capacitance associated therewith; and wherein the first current of the signal and second current of the signal are functions of a voltage of the signal and a derivative of the capacitance associated with the movable MEMS mirror.

14. The method of claim 1, wherein the movable MEMS mirror is driven with the periodic signal such that it rotates due to electrostatic forces between its rotor and its stator.

15. The method of claim 1, wherein the movable MEMS mirror is driven with the periodic signal such that it rotates due to magnetic forces between its rotor and its stator.

16. A method, comprising:
    measuring a signal flowing through a movable MEMS mirror as it oscillates; and
    generating an error signal as a function of a difference between a first current of the signal at a first instant in time and a second current of the signal at a second instant in time, the first and second instants in time being instants in time at which the first and second currents are expected to be equal for a given opening angle;
    when the error signal indicates that the first current of the signal at the first instant in time is less than the second current of the signal at the second instant in time, thereby indicating that an opening angle of the movable MEMS mirror is greater than a given angle, changing a driving signal for the movable MEMS mirror to decrease the opening angle; and
    when the error signal indicates that the first current of the signal at the first instant in time is less than the second current of the signal at the second instant in time, thereby indicating that the opening angle is greater than the given angle, changing the driving signal for the movable MEMS mirror to increase the opening angle.

17. The method of claim 16, wherein the driving signal is changed by changing a voltage thereof.

18. The method of claim 16, wherein when the driving signal is changed to increase the opening angle, the driving signal is changed so that the error signal is equal to zero.

19. The method of claim 16, wherein when the driving signal is changed to decrease the opening angle, the driving signal is changed so that the error signal is equal to zero.

20. The method of claim 16, wherein measuring the signal flowing through the movable MEMS mirror as it oscillates comprises directly electrically measuring a signal flowing through the movable MEMS mirror as it oscillates.

* * * * *